(12) United States Patent
Ahn

(10) Patent No.: US 12,496,741 B2
(45) Date of Patent: Dec. 16, 2025

(54) NOTCHING APPARATUS AND METHOD OF ELECTRODE SUBSTRATE

(71) Applicant: LG Energy Solution, Ltd., Seoul (KR)

(72) Inventor: Chang Bum Ahn, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 275 days.

(21) Appl. No.: 18/032,405

(22) PCT Filed: Jul. 27, 2022

(86) PCT No.: PCT/KR2022/011071
§ 371 (c)(1),
(2) Date: Apr. 18, 2023

(87) PCT Pub. No.: WO2023/033371
PCT Pub. Date: Mar. 9, 2023

(65) Prior Publication Data
US 2023/0381998 A1    Nov. 30, 2023

(30) Foreign Application Priority Data
Aug. 31, 2021   (KR) .................. 10-2021-0115771

(51) Int. Cl.
*B26F 1/12* (2006.01)
*B26F 1/14* (2006.01)
(Continued)

(52) U.S. Cl.
CPC .............. *B26F 1/12* (2013.01); *B26F 1/14* (2013.01); *H01M 4/0404* (2013.01); *H01M 10/0404* (2013.01)

(58) Field of Classification Search
CPC ........ B21D 22/02; B21D 37/10; B21D 28/02; B21D 28/04; B21D 28/34; B26F 1/02; B26F 1/12; B26F 1/14
See application file for complete search history.

(56) References Cited

U.S. PATENT DOCUMENTS 5,159,826 A * 11/1992 Miyazawa ............. B21D 22/04
                                                           72/358
5,361,660 A * 11/1994 Tsubota .................. B21D 28/12
                                                           83/171
(Continued)

FOREIGN PATENT DOCUMENTS

CN       203578587 U      5/2014
CN       208787640 U      4/2019
(Continued)

OTHER PUBLICATIONS

International Search Report for PCT/KR2022/011071 mailed Nov. 3, 2022. 3 pages.
(Continued)

*Primary Examiner* — Teresa M Ekiert
(74) *Attorney, Agent, or Firm* — Lerner David LLP

(57) ABSTRACT

A notching apparatus and method for an electrode substrate can improve the conventional problem of contamination of an electrode current collector by forming a punching oil supply hole in a punch and applying the punching oil to a wall surface of the punch through the punching oil supply hole, and can also discharge foreign objects generated when punching an electrode through the hole formed in the punch. The notching apparatus for the electrode substrate includes a die member on which the electrode substrate is disposed; and a punch member provided to be spaced above the die member and provided with a punch that moves up and down toward the die member. A wall surface of the punch is provided with one or more punching oil supply holes for applying the punching oil to an outer surface of the punch.

10 Claims, 5 Drawing Sheets

(51) Int. Cl.
*H01M 4/04* (2006.01)
*H01M 10/04* (2006.01)

(56) References Cited

U.S. PATENT DOCUMENTS

| | | |
|---|---|---|
| 2014/0069162 A1 | 3/2014 | Fukuchi et al. |
| 2018/0093388 A1 | 4/2018 | Yun et al. |

FOREIGN PATENT DOCUMENTS

| | | |
|---|---|---|
| CN | 212525607 U | 2/2021 |
| JP | H02087461 A | 3/1990 |
| JP | 2000094059 A | 4/2000 |
| JP | 2003100522 A | 4/2003 |
| JP | 2007007692 A | 1/2007 |
| JP | 2011045900 A | 3/2011 |
| KR | 200446799 Y1 | 12/2009 |
| KR | 20120017756 A | 2/2012 |
| KR | 20130073329 A | 7/2013 |
| KR | 20130095368 A | 8/2013 |
| KR | 101525721 B1 | 6/2015 |
| KR | 101751008 B1 | 6/2017 |
| KR | 20180010803 A | 1/2018 |
| KR | 20180013788 A | 2/2018 |
| KR | 102066909 B1 | 1/2020 |
| KR | 102252500 B1 | 5/2021 |

OTHER PUBLICATIONS

Search Report dated May 18, 2025 from the Office Action for Chinese Application No. 202280005810.9 Issued May 21, 2025, pp. 1-3.

* cited by examiner

【Figure 1】
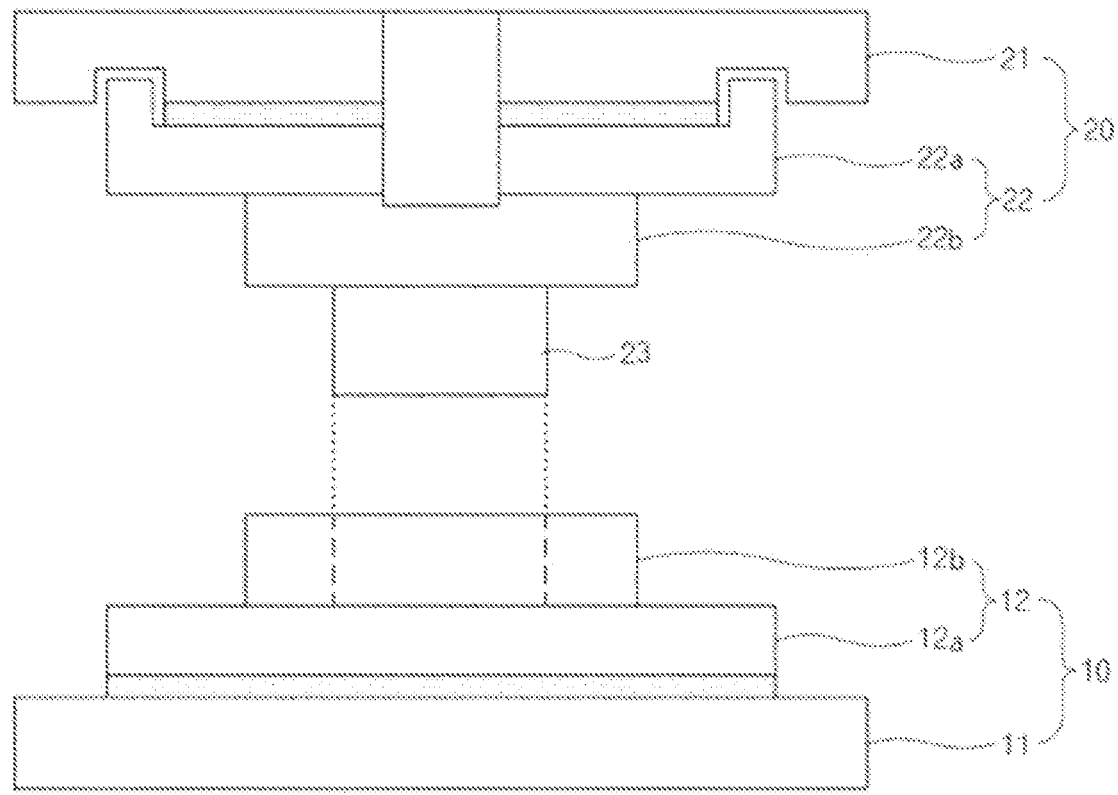
Prior Art
【Figure 2】
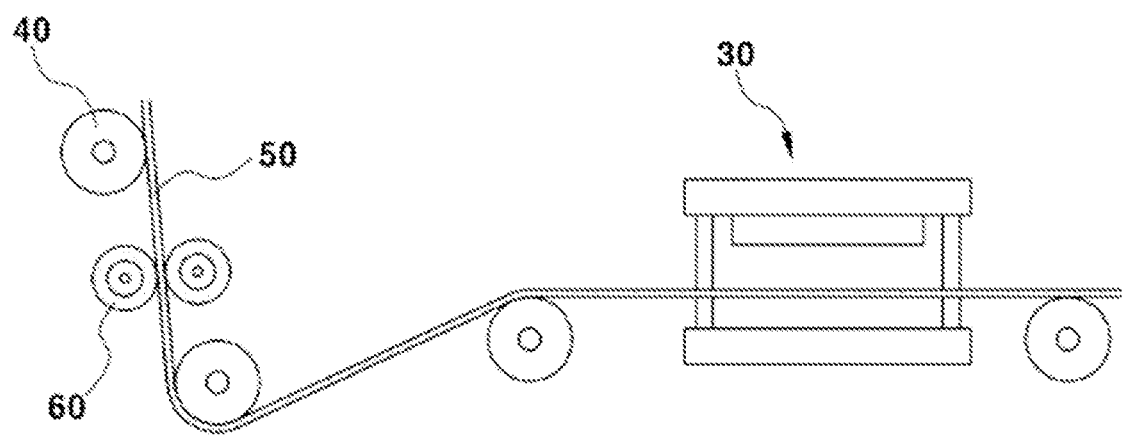
Prior Art

[Figure 3]
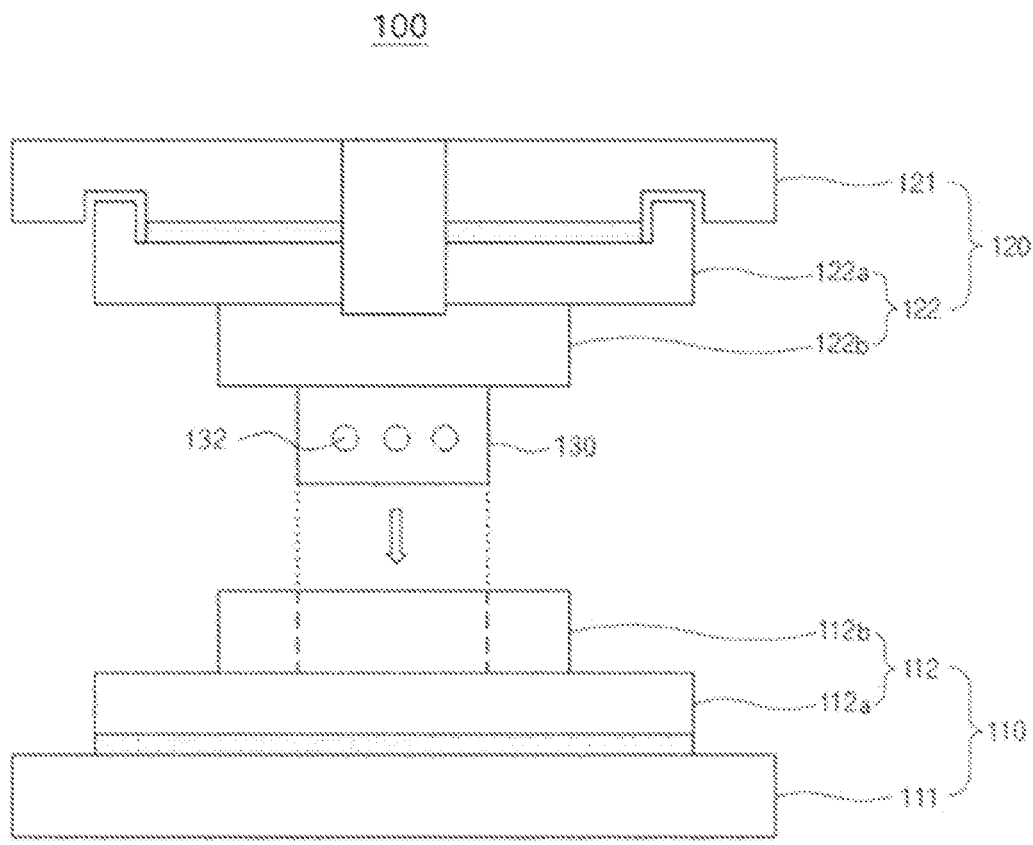

[Figure 4]
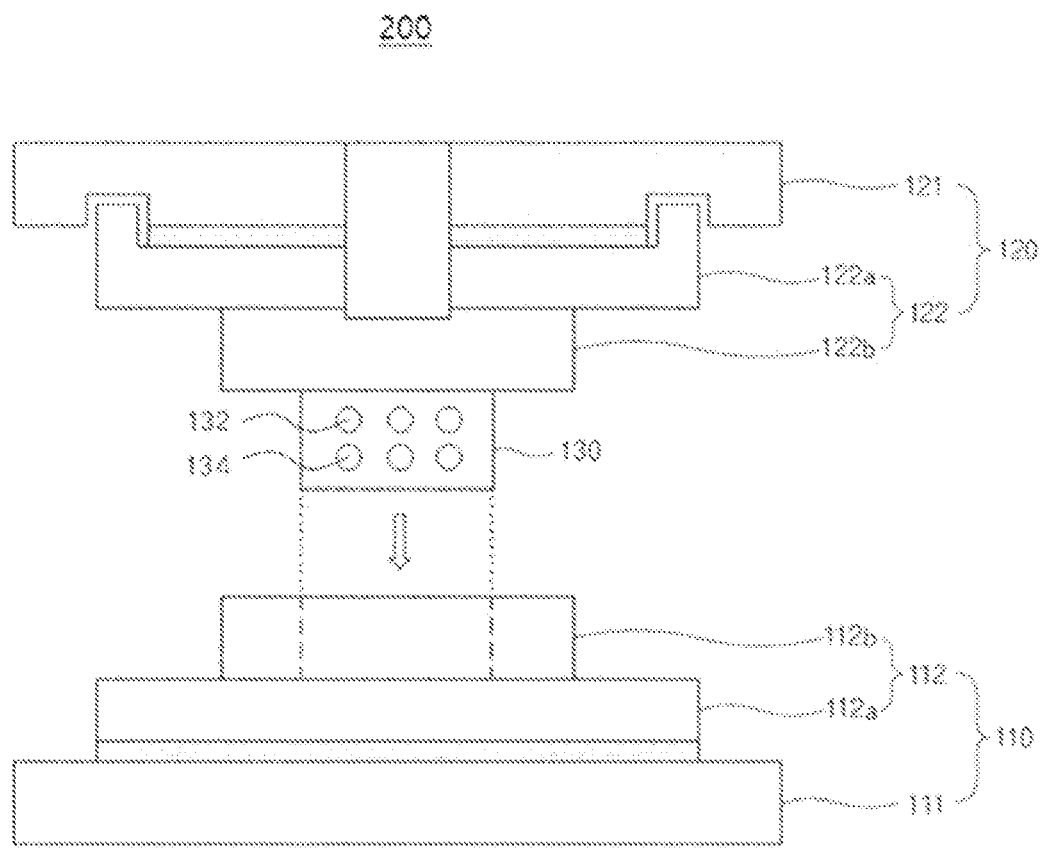

[Figure 5]
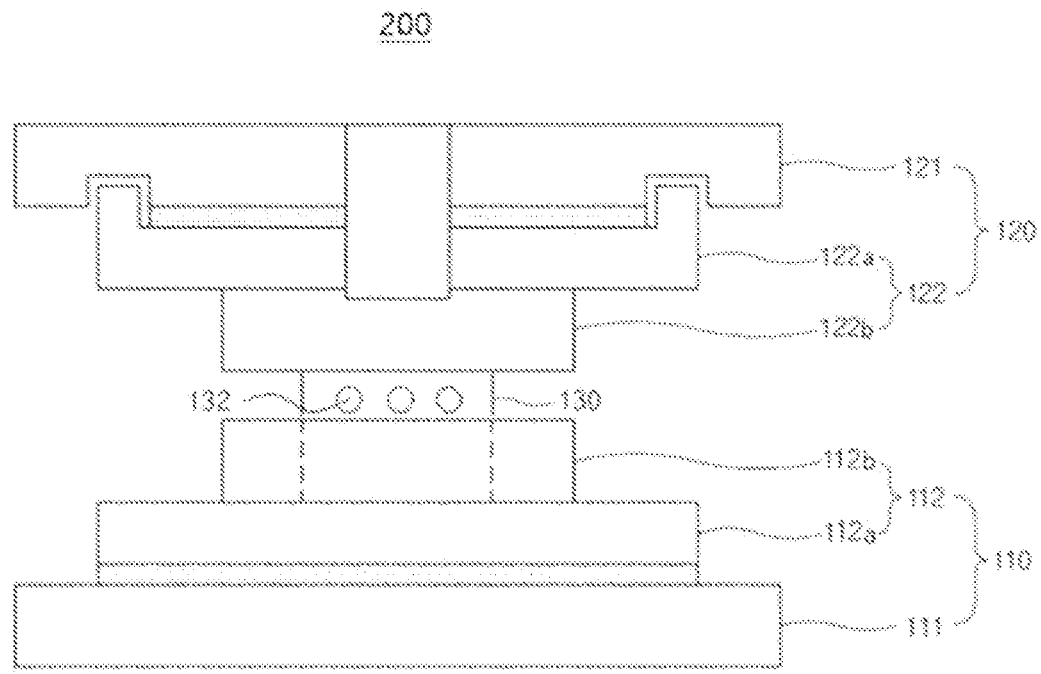
[Figure 6]
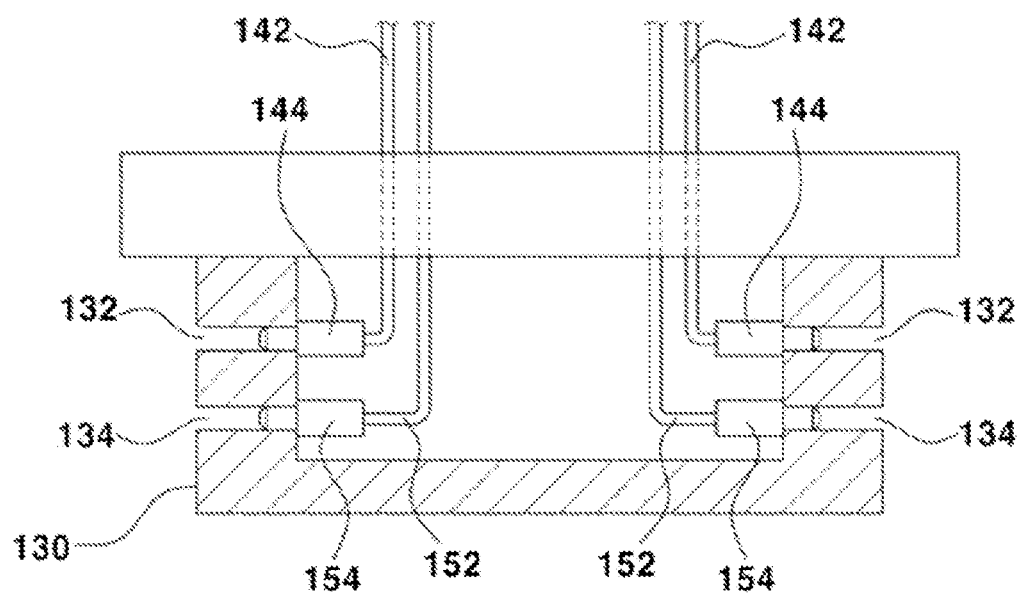

【Figure 7】
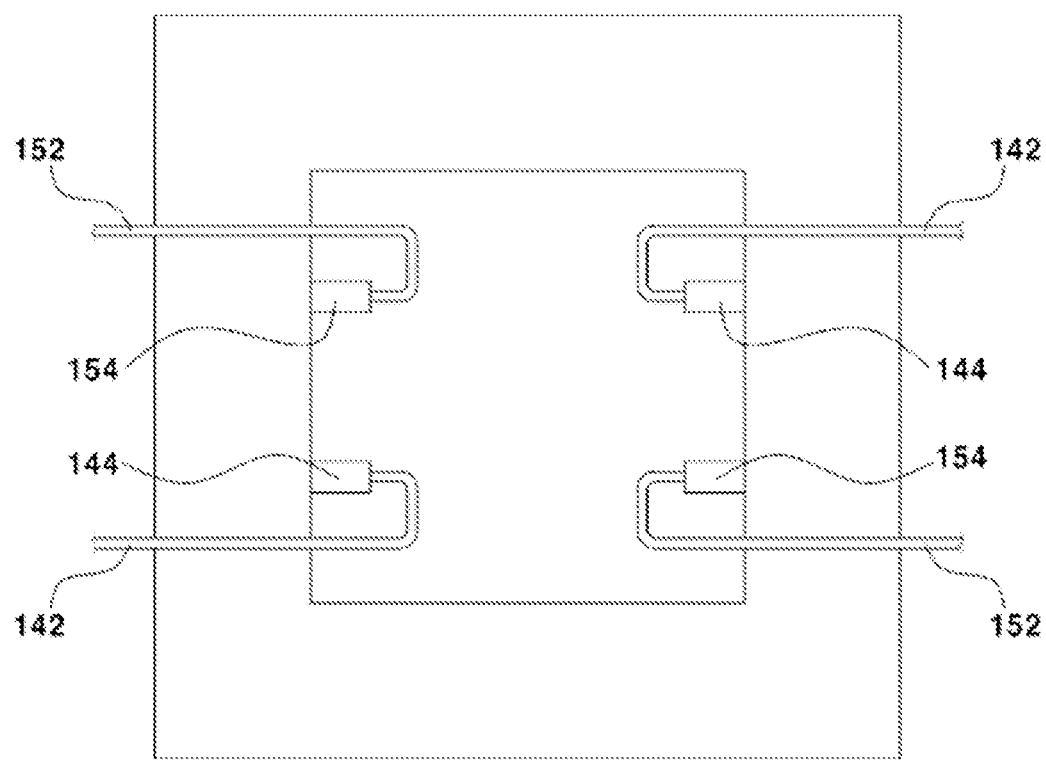

NOTCHING APPARATUS AND METHOD OF ELECTRODE SUBSTRATE

CROSS-REFERENCE TO RELATED APPLICATIONS

The present application is a national phase entry under 35 U.S.C § 371 of International Application No. PCT/KR2022/011071 filed on Jul. 27, 2022 which claims priority from Korean Patent Application No. 10-2021-0115771 filed on Aug. 31, 2021, all of which are incorporated herein by reference.

TECHNICAL FIELD

The present invention relates to a notching apparatus and method for an electrode substrate, and more particularly, to a notching apparatus and method for an electrode substrate, which can improve a conventional problem of contamination of an electrode current collector by forming a punching oil supply hole in a punch and applying the punching oil to a wall surface of the punch through the hole, and can also discharge foreign objects generated when punching an electrode through the hole formed in the punch.

BACKGROUND ART

With the explosive increase in technological development and demand for mobile devices and automobiles, more research is being conducted on a secondary battery with high energy density, discharge voltage and excellent output stability. Such a secondary battery generally has a structure which includes an electrode assembly having a structure in which electrodes (cathode and anode) and a separation membrane are alternately stacked, an electrolyte for moving ions to the electrodes, and a case that accommodates the electrode assembly and the electrolyte. Further, a manufacturing process of the secondary battery is roughly divided into an electrode plate process for manufacturing an anode and a cathode, an assembly process for manufacturing the anode and the cathode as an electrode assembly and inserting the electrode assembly into a case together with the electrolyte, and a formation machine for activating the ionic migration of the electrode assembly to have electricity. The electrode plate process, the assembly process and the formation process are each divided into individual detailed machines.

The electrode plate process includes a mixing process of adding and mixing a conductive material and a binder to the active material, a coating process of applying the mixed slurry composition onto a current collector, a press process of surface-pressing the current collector applied with the slurry composition, a slitting process of cutting the electrode manufactured by adhering the slurry composition to the surface of the current collector to fit the size, and a notching process for shearing to form an electrode tab on one end of the non-coated part of the cut electrode, and the like. At this time, the slitting process of cutting the electrode substrate applied with the active material on the surface of the current collector to fit the size, and the notching process of shearing to form an electrode tab on one end of the non-coated part of the cut electrode may be performed sequentially or simultaneously.

That is, the electrode substrate continuously provided at a standardized size passes through the slitting apparatus and the notching apparatus and is cut and machined to have a predetermined shape (for example, a shape in which an electrode tab protrudes to one side or the other side). The slitting apparatus and the notching apparatus may be configured separately, or may be configured so that cutting and machining are performed simultaneously by a single apparatus. Therefore, the slitting process and the notching process may be performed by the same punching apparatus, or may be performed by each of the slitting apparatus and the notching apparatus. At this time, the notching apparatus can be configured with a punch, a die, or the like.

FIG. 1 is a side view of a conventional notching apparatus. For example, the notching apparatus may be configured, as shown in FIG. 1, to include a die member 10 including a die holder 11 and a die plate 12 (a sub-die plate 12a, and a main die plate 12b); and a punch member 20 that includes a punch holder 21, a punch plate 22 (a sub-punch plate 22a and a main punch plate 22b) and a punch 23, and moves up and down toward the die member to shear one end of the electrode.

On the other hand, when the electrode notching process of a normal secondary battery is performed, a foil portion (current collector) of the electrode is burned to the notching apparatus, which inevitably causes problems such as poor punching and disconnection. FIG. 2 is a schematic diagram showing an aspect in which the electrode substrate is applied with punching oil before the electrode notching process. To improve the problem described above, the punching oil is directly applied to the electrode substrate 50, separately before the notching process using the notching apparatus 30 as shown in FIG. 2. That is to say, conventionally, through a method in which after both sides of the electrode substrate 50 conveyed through conveying rolls 40 are applied with the punching oil supplied by a punching oil supply unit 60, the electrode substrate 50 supplied with the punching oil is conveyed to the notching apparatus to perform the notching process, the problem of the foil portion (current collector) of electrode burned to the notching apparatus is prevented.

However, in this case, the foil portion (current collector) of the electrode is contaminated by the punching oil, causing problems such as poor welding. Further, the punching oil is not supplied and injected into the notching apparatus, causing a problem that the notching process is not smoothly performed.

Therefore, there is a demand for a measure in which the punching oil is supplied to prevent the foil portion (current collector) of the electrode from being burned to the notching apparatus, causing problems such as poor punching and disconnection, and the punching oil is not directly applied to the electrode substrate to prevent contamination of the foil portion (current collector) of the electrode.

DISCLOSURE

Technical Problem

Accordingly, an object of the present invention is to provide a notching apparatus and method for an electrode substrate, which can solve the conventional problem of contamination of an electrode current collector by forming a punching oil supply hole in a punch and applying the punching oil to a wall surface of the punch through the punching oil supply hole, and can also discharge foreign objects generated when an electrode is punched through the hole formed in the punch.

Technical Solution

In order to achieve the above object, the present invention provides a notching apparatus for an electrode substrate, including: a die member on which the electrode substrate is placed; and a punch member provided to be spaced above the die member and provided with a punch that moves up and down toward the die member. A wall surface of the punch is provided with one or more punching oil supply holes for applying a punching oil to an outer surface of the punch.

Further, the present invention provides a notching method for an electrode substrate, including: (a) a step of supplying a punching oil through a punching oil supply hole provided on a wall surface of a punch member, and applying the punching oil to an outer surface of the punch; and (b) a step of lowering the punch member to a die member side on which the electrode substrate is disposed, and notching the electrode substrate with the punch applied with the punching oil.

Advantageous Effects

The notching apparatus and method for an electrode substrate according to the present invention has an advantage which can solve the conventional problem of contamination of an electrode current collector by forming a punching oil supply hole in a punch of the notching apparatus and applying the punching oil to a wall surface of the punch through the punching oil supply hole. Further, notching apparatus and method for an electrode substrate according to the present invention has an advantage which can also discharge foreign objects generated, when an electrode is punched, through the hole formed in the punch of the notching apparatus.

DESCRIPTION OF DRAWINGS

FIG. 1 is a side view of a conventional notching apparatus.

FIG. 2 is a schematic diagram showing an aspect in which an electrode substrate is applied with a punching oil before an electrode notching process.

FIG. 3 is a side view of a notching apparatus according to an embodiment of the present invention.

FIG. 4 is a side view of a notching apparatus according to another embodiment of the present invention.

FIG. 5 is a side view showing an aspect in which the punch is lowered and inserted into a machining frame in the notching apparatus according to another embodiment of the present invention.

FIG. 6 is a side sectional view showing an aspect in which a punching oil supply line, and an air blow line and foreign object suction line are connected to the punch of the notching apparatus according to the present invention.

FIG. 7 is a plan view showing an aspect in which a punching oil supply line, and an air blow and foreign object suction line are connected to the punch of the notching apparatus according to the present invention.

BEST MODE

Hereinafter, embodiments of the present invention will be described in detail with reference to the accompanying drawings so that those skilled in the art can easily implement the present invention. The present invention may, however, be embodied in many different forms and, therefore, the present invention is not limited to the embodiments set forth below. Further, in order to explain the features of the present invention more clearly, it is made clear that the known parts deviating from the main configuration have been omitted from the drawings.

FIG. 3 is a side view of a notching apparatus according to one embodiment of the present invention. As shown in FIG. 3, a notching apparatus 100 according to the present invention includes a die member 110 on which an electrode substrate is disposed. And, the notching apparatus 100 includes a punch member 120 provided with a punch 130 spaced apart from above the die member 110 and vertically moves toward the die member 110 side. One or more punching oil supply holes 132 for applying the punching oil to the outer surface of the punch 130 are provided (or formed by being perforated) on the wall surface of the punch 130.

When the electrode notching process of the conventional secondary battery is performed, the current collector of the electrode is burned on to the notching apparatus (or notching mold), causing problems such as poor punching and disconnection. In order to improve this, as shown in FIG. 2, before the notching process using the notching apparatus 30, the electrode substrate 50 is separately applied directly with punching oil. In other words, in the prior art, the problem of the electrode current collector burned to the notching apparatus is prevented through the method in which both sides of the electrode substrate 50 conveyed through the conveying rolls 40 are applied with the punching oil supplied by the punching oil supply unit 60, and then the electrode substrate 50 supplied with the punching oil is conveyed to the notching apparatus 30 to perform the notching apparatus 30. However, in this case, the punching oil contaminates the current collector of the electrode, which causes problems such as poor welding, and causes a problem that the punching oil is not directly supplied and injected into the notching apparatus, and thus the notching process is not smoothly performed.

Accordingly, the present applicant suggests a technology that does not directly apply the punching oil to the electrode substrate to prevent contamination of the current collector of the electrode, while supplying the punching oil to prevent the current collector of the electrode from being burned to the notching apparatus and causing problems such as poor punching and disconnection.

A secondary battery generally has a structure which includes an electrode assembly having a structure in which electrodes (cathode and anode) and separation membranes are alternately stacked, an electrolyte for moving ions to the electrodes, and a case in which the electrode assembly and the electrolyte are accommodated. The manufacturing process of the secondary battery can be broadly divided into an electrode plate process for manufacturing an anode and a cathode, an assembly process for manufacturing the anode and the cathode as an electrode assembly and then inserting the electrode assembly into a case together with an electrolyte, and a formation process which activates the ionic migration of the assembly electrode to have electricity. The electrode plate process, the assembly process and the formation process are each divided into separate detailed machines.

Among them, the electrode plate process includes a mixing process of adding and mixing a conductive material and a binder to the active material, a coating process of applying the mixed slurry composition onto the current collector, a press process of surface-pressing the current collector applied with the slurry composition, a slitting process of cutting the electrode manufactured by adhering the slurry composition to the surface of the current collector to fit the size, a notching process of shearing to form an electrode tab on one end of the non-coated part of the cut electrode, and the like. At this time, the slitting process of cutting the electrode substrate applied with the active material on the surface of the current collector to fit the size, and the notching process of shearing to form an electrode tab at one end of the non-coated part of the cut electrode may be performed sequentially or simultaneously.

Therefore, through the notching apparatus according to the present invention, both notching for shearing to form an electrode tab at one end of the non-coated part of the uncut electrode, and slitting for cutting the electrode to fit the size may be performed, and only notching for machining one end of the non-coated part of the cut electrode may also be performed.

The electrode substrate may be a conventional one that can be applied to the notching process, and may be, for example, one manufactured by coating and pressing the slurry composition, in which the active material, the conductive material and the binder are mixed, to one surface of the current collector. In addition, the electrode substrate may be divided into a holding part applied with the active material and a non-coated part in which the electrode tab is formed without being applied with the active material, and notching may be a process of shearing one end of the non-coated part. However, this is only an example, and it is obvious that works that can be performed in a normal secondary battery notching process can be performed.

The notching apparatus 100 according to the present invention will be specifically described with reference to FIG. 3. In the notching apparatus 100 of the present invention, the die member 110 has continuously supplied electrode substrates (that is, workpiece) disposed thereon, and may include a die holder 111, a die plate 112 (a sub-die plate 112a and a main die plate 112b) and the like. If desired, the main die plate 112b may be formed with a machining frame (the portion indicated by the broken line of 112b). Moreover, it is not necessary to include both the sub-die plate 112a and the main die plate 112b, and only one die plate among them may be provided. By such a die member 110, it is possible to stably prevent or minimize the separation or drift of the workpiece during the machining operation. On the other hand, the sub-die plate 112a is detachably fixed to the die holder 111, and since the die plates 112 of various standards may be exchanged for use, it is possible to improve workability and compatibility. Further, as shown in FIG. 3, a buffer member may be interposed between the die holder 111 and the sub-die plate 112a, thereby reducing noise and vibration to improve the machining accuracy.

The punch member 120 is provided to be spaced above the die member 110, moves up and down toward the die member 110, and may include a punch holder 121 and a punch plate (122, a sub-punch plate 122a and a main punch plate 122b). Moreover, it is not necessary to include both the sub-punch plate 122a and the main punch plate 122b, and only one punch plate of them may be provided. On the other hand, since the sub-punch plate 122a is detachably fixed to the punch holder 121, and punch plates 122 of various standards may be exchanged for use, thereby improving workability and compatibility. Also, if the punch 130 coupled to the lower end of the main punch plate 122b is damaged or needs to be replaced with a punch of another standard, the main punch plate 122b may be separated from the sub-punch plate 122a and then replaced with another main punch plate. Further, as shown in FIG. 3, a buffer member may be interposed between the punch holder 121 and the sub-punch plate 122a, thereby reducing noise and vibration and thus improving machining accuracy.

The punch 130 is coupled to the lower end of the punch member 120, moves up and down together with the punch member 120, and directly machines a workpiece (an electrode substrate). That is, through the punch 130, one or more of notching process for shearing to form an electrode tab at one end of the non-coated part of the electrode and slitting for cutting the electrode to fit the size may be performed, and a work that requires separate punching may also be performed as necessary. In addition, the punch 130 machines the workpiece, while descending to the main die plate 112b of the die member 110 together with the punch member 120, and also may perform machining by being inserted into the machining frame (the portion indicated by the broken line of 112b) that can be formed on the main die plate 112b as necessary.

The wall surface of the punch 130 is provided with (or formed by perforating) one or more punching oil supply holes 132. This is to eliminate the problem (the current collector of the electrode is contaminated and causes problems such as poor welding) caused by directly applying the punching oil to the electrode substrate before the notching process, as described above. That is, according to the present invention, the punching oil is applied to the outer surface of the punch 130 through the punching oil supply hole 132, and the application of the punching oil is preferably performed before the notching process starts. This is because the problem of contamination of the current collector of the electrode may be prevented or minimized. However, in consideration of repeated machining, additional subsequent application may be intermittently performed even after machining starts, and it is preferable that the application is performed in the state in which the punch 130 is separated from the die member 110 even in the case of subsequent application, in order to prevent or minimize the problem of continuous contamination of the electrode current collector. In addition, the punching oil may be applied to the outer surface of the punch 130, but in the case of a punch having an opening at the bottom, the punching oil may also be applied to the inner surface of the punch as necessary.

One or more punching oil supply holes 132 may be provided on the wall surface of the punch 130, and the number of punching oil supply holes 132 may be appropriately set in consideration of the size and area of punch, the number of repetitions of machining, and the like. On the other hand, although three punching oil supply holes 132 are formed in FIG. 3, this is only an aspect. The size of the punching oil supply hole 132 is also not particularly limited, and it is clarified that this is also variable depending on the size and area of the punch 130, the number of repetitions of machining, and the like. However, in an example, the punching oil supply hole 132 may have a diameter of 1 to 2 mm. Also, as an example, the punching oil supply hole 132 may be provided at a position 30 to 40 mm away from the lowermost end of the punch 130.

The punching oil supply hole 132 may be connected to a punching oil supply line connected to a punching oil reservoir (if necessary, including a punching oil supply nozzle). Therefore, the punching oil may be conveyed sequentially through the punching oil reservoir and the punching oil supply line, and may be applied to the outer surface of the punch through the punching oil supply hole connected to the punching oil supply line. The supply of punching oil can then be controlled through a punching oil control valve. Therefore, it is possible not only to control the supply amount of the punching oil as well as the opening and closing through the punching oil control valve.

On the other hand, it is possible to blow air into the notching apparatus 100 and discharge foreign object such as dust generated during the notching process, through the punching oil supply hole 132 formed in the notching apparatus 100 of the present invention. Therefore, in this case, instead of the punching oil supply line, the air blow and foreign object suction line may be connected to the punching oil supply hole 132.

However, in order to avoid inconvenience in which the air blow and foreign object suction line is connected to the punching oil supply hole 132 instead of the punching oil supply line, and then the punching oil supply line is connected to the punching oil supply hole 132, the air blow and foreign object suction holes may also be additionally provided on the wall surface of the punch 130, in addition to the punching oil supply hole 132. FIG. 4 is a side view of a notching apparatus according to another embodiment of the present invention. That is, as shown in FIG. 4, a notching apparatus 200 according to another embodiment of the present invention may include not only a punching oil supply hole 132 but also one or more air blow and foreign object suction holes 134 on the wall surface of the punch 130.

As described above, if the air blow and foreign object suction holes 134 are also provided on the wall surface of the punch 130, there is an advantage that the foreign object may be immediately removed from the interior of the notching apparatus at the same time as punching. If the foreign object is not removed at the same time as punching, there is a possibility that the punching oil will mix with the foreign object to increase the resistance inside the notching apparatus. Therefore, it is preferable to separately form the air blow and foreign object suction hole 134, rather than discharging the foreign object through the punching oil supply hole 132, so that the punching oil supply hole 132, and the air blow and foreign object suction hole 134 serve their original roles independently at the same time.

On the other hand, if the suction is performed after air is blown to the inside of the notching apparatus as described above, foreign object such as dust may be discharged to the outside of the notching apparatus. Furthermore, when air is blown to the inside of the notching apparatus, an air layer is formed between the die member 110 and the punch member 120 of the notching apparatus, which can even function as an air lubricant inside the notching apparatus.

As with the punching oil supply hole 132, one or more air blow and foreign object suction holes 134 may be provided on the wall surface of the punch 130, and the number of air blow and foreign object suction holes 134 may be appropriately set in consideration of the size and area of the punch, the number of repetitions of machining, and the like. On the other hand, although three air blow and foreign object suction holes 134 are formed in FIG. 4, this is only an aspect. The size of the air blow and foreign object suction hole 134 is also not particularly limited, and it is obvious that this is also variable depending on the size and area of the punch 130, the number of repetitions of machining, and the like. However, the air blow and foreign object suction hole 134 is preferably positioned below the punching oil supply hole 132 (that is, preferably positioned at the lower end on the basis of the reference the punching oil supply hole 132) to quickly remove foreign object and form an air layer. Therefore, as an example, the air blow and foreign object suction hole 134 may be formed at a position away from the lowermost end of the punch 130 by 10 to 15 mm (at this time, the punching oil supply hole 132 may be formed at a position away from the lowermost end of the punch 130 by 30 mm to 40 mm).

FIG. 5 is a side view showing an aspect in which the punch is lowered and inserted into the machining frame in the notching apparatus according to another embodiment of the present invention. As described above, the punch 130 machines the workpiece, while descending to the main die plate 112b of the die member 110 together with the punch member 120. As shown in FIG. 4, at this time, when the punching oil supply hole 132, the air blow and foreign object suction hole 134 are provided on the wall surface of the punch 130, as shown in FIG. 5, only the air blow and foreign object suction hole 134 of the punch 130 may be accommodated inside the main die plate 112b of the die member 110. In other words, even if the punch 130 is lowered, the punching oil supply hole 132 is preferably not accommodated inside the main die plate 112b. That is, this is because the punching oil is applied to the outer surface of the punch 130 before machining, and the air blow and foreign object suction functions operate during machining.

FIG. 6 is a side cross-sectional view showing an aspect in which the punching oil supply line, and the air blow and foreign object suction line are connected to the punch of the notching apparatus according to the present invention, and FIG. 7 is a plan view showing a state in which the punching oil supply line, the air blow and foreign object suction line are connected to the punch of the notching apparatus according to the present invention. As described above, the punching oil supply hole 132 may be connected to the punching oil supply line connected to the punching oil reservoir, and can even include a punching oil supply nozzle if necessary at the time of connecting. More specifically described with reference to FIGS. 6 and 7, the punching oil may be conveyed sequentially through the punching oil reservoir (not shown), the punching oil supply line 142 and the punching oil supply nozzle 144. The punching oil may be applied to the outer surface of the punch 130 through the punching oil supply hole 132 connected to the punching oil supply nozzle 144. However, although FIGS. 6 and 7 also show the punching oil supply nozzle 144, this is only one embodiment, and therefore the punching oil supply line 142 may be directly connected to the punching oil supply hole 132. Further, as shown in FIGS. 6 and 7, the punching oil supply hole 132 may also be formed on the opposite side of the punch 130. Further, there is no particular restriction on the position of the punching oil reservoir.

Continuously referring to FIGS. 6 and 7, the air blow and foreign object suction nozzle 154 may be connected to the air blow and foreign object suction hole 134, and the air blow and foreign object suction nozzle 154 may be connected with the air blow and foreign object suction line 152. However, although air blow and foreign object suction nozzles 154 are shown in FIGS. 6 and 7, this is only an embodiment, and therefore it is obvious that air blow and foreign object suction lines 152 may be directly connected to the air blow and foreign object suction holes 134. Further, it is obvious that the air blow and foreign object suction holes 134 may also be formed on the opposite side of the punch 130, as shown in FIGS. 6 and 7.

Also, although FIGS. 6 and 7 also show one punching oil supply nozzle 144 and one air blow and foreign object suction nozzle 154 on one side of the punch 130, this is only an example shown for convenience of explanation, and it is obvious that the punching oil supply holes 132 and the air blow and foreign object suction holes 134 are provided to be suitable for the number of formations.

Next, a method for notching an electrode substrate according to the present invention will be described. Referring to FIGS. 3 and 4 again, the notching method for the electrode substrate includes: (a) a step of supplying a punching oil through a punching oil supply hole 132 provided on the wall surface of the punch 130 of the punch member 120, and applying the punching oil to an outer surface of the punch 130, and (b) a step of lowering the punch member 120 to the die member 110 side on which the electrode substrate is disposed, and notching the electrode substrate with the punch 130 applied with the punching oil. Further, the punching oil may be sequentially conveyed through the punching oil reservoir and the punching oil supply line and applied to the outer surface of the punch 130 through the punching oil supply hole 132.

The punching oil is applied to the outer surface of the punch 130, and the application of the punching oil is preferably performed before the notching process of step (b) starts. By doing so, it is possible to prevent or minimize the direct application of the punching oil to the electrode substrate, thereby preventing or minimizing the problem of contamination of the current collector of the electrode. However, in consideration of repeated machining, additional subsequent applications may be performed intermittently while notching is being performed (similarly applied to the outer surface of the punch), and it is preferred that subsequent coating also be performed, while the punch 130 is spaced apart from the die member 110 to continuously prevent or minimize the problem of contamination of the electric collector of the electrodes (of course, it is possible to apply the punching oil to the outer surface of the punch 130 even during machining). Therefore, the present invention reveals that a process of applying the punching oil to the electrode substrate using a separate punching oil unit prior to the notching process as in the related art is eliminated (i.e., the punching oil does not contact the electrode substrate before the electrode substrate is placed in the notching apparatus or is notched). In addition, the punching oil may be applied to the outer surface of the punch 130, but in the case of a punch having an opening at the bottom, the punching oil may also be applied to an inner surface of the punch as necessary.

On the other hand, the punching oil applied to the outer surface of the punch 130 through the punching oil supply hole 132 may be sequentially conveyed and supplied through the punching oil reservoir and the punching oil supply line. Also, the supply of punching oil may be controlled through a punching oil control valve. Therefore, it is possible to control not only opening and closing but also the supply amount of the punching oil through the punching oil control valve, and the supply amount of the punching oil may be controlled in consideration of the machining conditions or the like of the electrode substrate. Also, the punching oil may be applied onto the outer surface of the punch 130 in a spraying manner through the punching oil supply nozzle. The punching oil may be one commonly used in the industry, and the type thereof is not limited.

Meanwhile, according to another embodiment of the present invention, the punch 130 may further include an air blow and foreign object suction hole 134, in addition to the punching oil supply hole 132, on its wall surface. Therefore, in this case, air is blown to the interior of the notching apparatus at the same time as the notching of the step (b), foreign object such as dust generated at the time of the notching may be discharged to the outside, and the air layer is formed between the die member 110 and the punch member 120 of the notching apparatus. When the foreign object such as dust is discharged to the outside at the same time as machining, it is possible to prevent or minimize the possibility that the punching oil and the foreign object are mixed to increase the resistance in the notching apparatus. Further, when an air layer is formed between the die member 110 and the punch member 120, the air layer functions as an air lubricant in the notching apparatus, which is more advantageous for the notching process.

Although the present invention has been described as above through preferred embodiments, the present invention is not limited thereto, and it will be easily understood by those skilled in the art to which the present invention pertains that various modifications and variations may be made unless departing the concept and scope of the claims to be described below.

DESCRIPTION OF SYMBOL 100, 200: Notching apparatus,
110: Die member,
111: Die holder,
112: Die plate (112a: Sub-die plate, 112b: Main die plate),
120: Punch member,
121: Punch holder,
122: Punch plate (122a: Sub-punch plate, 122b: Main punch plate),
130: Punch
132: Punching oil supply hole,
134: Air blow and foreign object suction hole,
142: Punching oil supply line,
144: Punching oil supply nozzle,
152: Air blow and foreign object suction line,
154: Air blow and foreign object suction nozzle

The invention claimed is:

1. A notching apparatus for an electrode substrate, comprising:
   a die member on which the electrode substrate is configured to be disposed; and
   a punch member spaced apart from the die member along a vertical dimension, the punch member including a punch configured to move along the vertical dimension with respect to the die member,
   wherein a first wall surface of the punch is provided with a first punching oil supply hole configured to apply a punching oil to a first outer surface of the punch or a first inner surface of the punch,
   wherein the first wall surface of the punch is further provided with a first air blow and foreign object suction hole,
   wherein each of the first punching oil supply hole and the first air blow and foreign object suction hole extend from the first inner surface of the punch to the first outer surface of the punch, and
   wherein the first punching oil supply hole and the first air blow and foreign object suction hole are configured to be disposed opposite to a first inner surface of the die member when the punch is received therein.

2. The notching apparatus for the electrode substrate according to claim 1,
   wherein the first punching oil supply hole is connected to a first punching oil supply line, the first punching oil supply line being connected to a punching oil reservoir,
   wherein the punching oil is configured to move sequentially through the punching oil reservoir, the first punching oil supply line, and the first punching oil supply hole, wherein the first punching oil supply hole is configured to apply the punching oil to the first outer surface of the punch.

3. The notching apparatus for the electrode substrate according to claim 1,
wherein the first air blow and foreign object suction hole is configured to discharge foreign objects, and the first air blow and foreign object suction hole is further configured to form an air layer between the die member and the punch member.

4. The notching apparatus for the electrode substrate according to claim 3,
wherein the first air blow and foreign object suction hole is positioned in the vertical dimension below the first punching oil supply hole, wherein the first air blow and suction hole is positioned closer to the die member than the first punching oil supply hole.

5. The notching apparatus for the electrode substrate according to claim 1,
wherein the notching apparatus is configured to shear the electrode substrate,
wherein the electrode substrate includes a holding part and a non-coated part, the holding part being applied with an active material, and the non-coated part lacking the active material, and
wherein an end of the non-coated part is configured to be sheared, and an end of the holding part is configured to be sheared.

6. A notching method for an electrode substrate, comprising:
(a) supplying a punching oil through a first punching oil supply hole provided on a first wall surface of a punch member, and applying the punching oil to a first outer surface of a punch; and
(b) moving the punch member in a vertical dimension towards a die member surface on which the electrode substrate is disposed, and notching the electrode substrate with the punch having the punching oil applied to the first outer surface,
wherein at a same time as the notching, the first wall surface of the punch is further provided with a first air blow and foreign object suction hole to blow air, so as to form an air layer between the die member and the punch member.

7. The notching method for the electrode substrate according to claim 6,
wherein the punching oil is applied to the first outer surface of the punch during the notching.

8. The notching method for the electrode substrate according to claim 6,
wherein the punching oil does not contact the electrode substrate before the electrode substrate is notched.

9. The notching method for the electrode substrate according to claim 6,
wherein in the supplying, the punching oil is sequentially conveyed through a punching oil reservoir and a first punching oil supply line, and the punching oil is applied to the first outer surface of the punch through the punching oil supply hole.

10. The notching method for the electrode substrate according to claim 6, wherein the first air blow and foreign object suction hole, air is blown at the same time as the notching to discharge foreign objects.

* * * * *